United States Patent
Hou et al.

(10) Patent No.: US 10,360,257 B2
(45) Date of Patent: Jul. 23, 2019

(54) SYSTEM AND METHOD FOR IMAGE ANNOTATION

(71) Applicant: TuSimple, San Diego, CA (US)

(72) Inventors: Xiaodi Hou, San Diego, CA (US); Siyuan Liu, San Diego, CA (US); Kai Zhou, San Diego, CA (US)

(73) Assignee: TuSimple, San Diego, CA (US)

( * ) Notice: Subject to any disclaimer, the term of this patent is extended or adjusted under 35 U.S.C. 154(b) by 0 days.

(21) Appl. No.: 15/672,217

(22) Filed: Aug. 8, 2017

(65) Prior Publication Data

US 2019/0050428 A1 Feb. 14, 2019

(51) Int. Cl.
| | | |
|---|---|---|
| G06F 17/00 | (2019.01) | |
| G06F 16/58 | (2019.01) | |
| G06F 17/24 | (2006.01) | |
| G06F 16/583 | (2019.01) | |

(52) U.S. Cl.
CPC ............ *G06F 16/58* (2019.01); *G06F 16/583* (2019.01); *G06F 17/241* (2013.01)

(58) Field of Classification Search
CPC .................................................. G06F 17/243
USPC ........................................ 715/230, 231, 233
See application file for complete search history.

(56) References Cited

U.S. PATENT DOCUMENTS

| | | |
|---|---|---|
| 6,777,904 B1 | 8/2004 | Degner |
| 7,103,460 B1 | 9/2006 | Breed |
| 7,689,559 B2 | 3/2010 | Canright |
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |

(Continued)

FOREIGN PATENT DOCUMENTS

| | | |
|---|---|---|
| EP | 1754179 A1 | 2/2007 |
| EP | 2448251 A2 | 5/2012 |

(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.

(Continued)

*Primary Examiner* — Stephen S Hong
*Assistant Examiner* — Matthew J Ludwig
(74) *Attorney, Agent, or Firm* — Inventive Law Inc.; Jim H Salter (57) ABSTRACT

A system and method for implementing an image annotation platform are disclosed. A particular embodiment includes: registering a plurality of labelers to which annotation tasks are assigned; assigning annotation tasks to the plurality of labelers; determining if the annotation tasks can be closed or re-assigned to the plurality of labelers; aggregating annotations provided by the plurality of labelers as a result of the closed annotation tasks; evaluating a level of performance of the plurality of labelers in providing the annotations; and calculating payments for the plurality of labelers based on the quantity and quality of the annotations provided by the plurality of labelers.

20 Claims, 5 Drawing Sheets

(56) References Cited

U.S. PATENT DOCUMENTS

| | | | |
|---|---|---|---|
| 8,190,990 B2* | 5/2012 | Le | G06F 16/9558 |
| | | | 715/231 |
| 8,271,871 B2 | 9/2012 | Marchesotti | |
| 8,378,851 B2 | 2/2013 | Stein | |
| 8,392,117 B2 | 3/2013 | Dolgov | |
| 8,401,292 B2 | 3/2013 | Park | |
| 8,412,449 B2 | 4/2013 | Trepagnier | |
| 8,478,072 B2 | 7/2013 | Aisaka | |
| 8,553,088 B2 | 10/2013 | Stein | |
| 8,713,703 B2* | 4/2014 | Fisk | G06F 21/36 |
| | | | 726/2 |
| 8,788,134 B1 | 7/2014 | Litkouhi | |
| 8,908,041 B2 | 12/2014 | Stein | |
| 8,917,169 B2 | 12/2014 | Schofield | |
| 8,963,913 B2 | 2/2015 | Baek | |
| 8,965,621 B1 | 2/2015 | Urmson | |
| 8,981,966 B2 | 3/2015 | Stein | |
| 8,993,951 B2 | 3/2015 | Schofield | |
| 9,002,632 B1 | 4/2015 | Emigh | |
| 9,008,369 B2 | 4/2015 | Schofield | |
| 9,025,880 B2 | 5/2015 | Perazzi | |
| 9,042,648 B2 | 5/2015 | Wang | |
| 9,111,444 B2 | 8/2015 | Kaganovich | |
| 9,117,133 B2 | 8/2015 | Barnes | |
| 9,118,816 B2 | 8/2015 | Stein | |
| 9,120,485 B1 | 9/2015 | Dolgov | |
| 9,122,954 B2 | 9/2015 | Srebnik | |
| 9,134,402 B2 | 9/2015 | Sebastian | |
| 9,145,116 B2 | 9/2015 | Clarke | |
| 9,147,255 B1 | 9/2015 | Zhang | |
| 9,156,473 B2 | 10/2015 | Clarke | |
| 9,176,006 B2 | 11/2015 | Stein | |
| 9,179,072 B2 | 11/2015 | Stein | |
| 9,183,447 B1* | 11/2015 | Gdalyahu | G06K 9/00791 |
| 9,185,360 B2 | 11/2015 | Stein | |
| 9,191,634 B2 | 11/2015 | Schofield | |
| 9,225,531 B2* | 12/2015 | Hachey | H04L 9/3271 |
| 9,233,659 B2 | 1/2016 | Rosenbaum | |
| 9,233,688 B2* | 1/2016 | Clarke | B60W 30/00 |
| 9,248,832 B2 | 2/2016 | Huberman | |
| 9,248,835 B2 | 2/2016 | Tanzmeister | |
| 9,251,708 B2 | 2/2016 | Rosenbaum | |
| 9,277,132 B2 | 3/2016 | Berberian | |
| 9,280,711 B2 | 3/2016 | Stein | |
| 9,286,522 B2 | 3/2016 | Stein | |
| 9,297,641 B2 | 3/2016 | Stein | |
| 9,299,004 B2 | 3/2016 | Lin | |
| 9,315,192 B1 | 4/2016 | Zhu | |
| 9,317,033 B2 | 4/2016 | Ibanez-guzman | |
| 9,317,776 B1 | 4/2016 | Honda | |
| 9,330,334 B2 | 5/2016 | Lin | |
| 9,342,074 B2 | 5/2016 | Dolgov | |
| 9,355,635 B2 | 5/2016 | Gao | |
| 9,365,214 B2 | 6/2016 | Ben Shalom | |
| 9,399,397 B2 | 7/2016 | Mizutani | |
| 9,428,192 B2 | 8/2016 | Schofield | |
| 9,436,880 B2 | 9/2016 | Bos | |
| 9,438,878 B2 | 9/2016 | Niebla | |
| 9,443,163 B2 | 9/2016 | Springer | |
| 9,446,765 B2 | 9/2016 | Ben Shalom | |
| 9,459,515 B2 | 10/2016 | Stein | |
| 9,466,006 B2 | 10/2016 | Duan | |
| 9,476,970 B1 | 10/2016 | Fairfield | |
| 9,490,064 B2 | 11/2016 | Hirosawa | |
| 9,531,966 B2 | 12/2016 | Stein | |
| 9,535,423 B1 | 1/2017 | Debreczeni | |
| 9,555,803 B2 | 1/2017 | Pawlicki | |
| 9,568,915 B1 | 2/2017 | Berntorp | |
| 9,587,952 B1 | 3/2017 | Slusar | |
| 9,720,418 B2 | 8/2017 | Stenneth | |
| 9,723,097 B2 | 8/2017 | Harris | |
| 9,723,099 B2 | 8/2017 | Chen | |
| 9,738,280 B2 | 8/2017 | Rayes | |
| 9,746,550 B2 | 8/2017 | Nath | |
| 9,990,687 B1* | 6/2018 | Kaufhold | G06N 3/0454 |
| 2007/0230792 A1 | 10/2007 | Shashua | |
| 2008/0249667 A1 | 10/2008 | Horvitz | |
| 2009/0040054 A1 | 2/2009 | Wang | |
| 2010/0049397 A1 | 2/2010 | Lin | |
| 2010/0174603 A1* | 7/2010 | Hughes | G06Q 30/02 |
| | | | 705/14.42 |
| 2010/0226564 A1 | 9/2010 | Marchesotti | |
| 2010/0281361 A1 | 11/2010 | Marchesotti | |
| 2011/0206282 A1 | 8/2011 | Aisaka | |
| 2012/0105639 A1 | 5/2012 | Stein | |
| 2012/0140076 A1 | 6/2012 | Rosenbaum | |
| 2012/0274629 A1 | 11/2012 | Baek | |
| 2013/0346356 A1* | 12/2013 | Welinder | G06F 17/30598 |
| | | | 706/52 |
| 2014/0145516 A1 | 5/2014 | Hirosawa | |
| 2014/0198184 A1 | 7/2014 | Stein | |
| 2015/0062304 A1 | 3/2015 | Stein | |
| 2015/0353082 A1 | 12/2015 | Lee | |
| 2016/0037064 A1 | 2/2016 | Stein | |
| 2016/0094774 A1 | 3/2016 | Li | |
| 2016/0129907 A1 | 5/2016 | Kim | |
| 2016/0165157 A1 | 6/2016 | Stein | |
| 2016/0210528 A1 | 7/2016 | Duan | |
| 2016/0321381 A1 | 11/2016 | English | |
| 2016/0375907 A1 | 12/2016 | Erban | |
| 2017/0185670 A1* | 6/2017 | Dua | G06F 17/241 |
| 2017/0185869 A1* | 6/2017 | Dua | G06K 9/52 |
| 2019/0026278 A1* | 1/2019 | Abedin | G06F 17/248 |

FOREIGN PATENT DOCUMENTS

| | | |
|---|---|---|
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A1 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | 2448251 A3 | 10/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, num. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L, "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR3 13, vol. 2013, pp. 1-8, IEEE, 2013.

(56) References Cited

OTHER PUBLICATIONS

Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yanghao and Wang, Naiyan and Liu, Jiaying and Hou, Xiaodi, "Demystifying Neural Style Transfer", arXiv preprint arXiv:1701.01036, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.
Li, Yanghao and Wang, Naiyan and Liu, Jiaying and Hou, Xiaodi, "Factorized Bilinear Models for Image Recognition", arXiv preprint arXiv:1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journal, vol. 29 issue: 12, pp. 1498-1515 Article first published online: Oct. 7, 2010;Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
Kyoungho Ahn, Hesham Rakha, "The Effects of Route Choice Decisions on Vehicle Energy Consumption and Emissions", Virginia Tech Transportation Institute, Blacksburg, VA 24061, date unknown.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA, date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, Vol. 17, No. 3, March 2007.
Marius Cordts, Mohamed Omran, Sebastian Ramos, Timo Rehfeld, Markus Enzweiler Rodrigo Benenson, Uwe Franke Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
Peter Welinder, Steve Branson, Serge Belongie, Pietro Perona, "The Multidimensional Wisdom of Crowds"; http://www.vision.calteph.edu/visipedia/papers/WelinderEtalNIPS10.pdf, 2010.

\* cited by examiner

SYSTEM AND METHOD FOR IMAGE ANNOTATION

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2017, TuSimple, All Rights Reserved.

TECHNICAL FIELD

This patent document pertains generally to tools (systems, apparatuses, methodologies, computer program products, etc.) for image processing, image annotation, object labeling, autonomous driving control systems, autonomous driving simulation systems, trajectory planning, and vehicle control systems, and more particularly, but not by way of limitation, to a system and method for implementing an image annotation platform.

BACKGROUND

Images and image analysis are increasingly being used for autonomous vehicle control and simulation. An important aspect of this task is to identify objects in sets of received images or video feeds. The identification and location of objects in the images can be useful for configuring the control or simulation of a vehicle. However, it can be very difficult to automate the process of image analysis and object labeling. Variations in image quality, environmental conditions, and processing capabilities can hinder the image analysis and object labeling process. Consequently, it can be difficult for autonomous vehicle control and simulation systems to perform effectively.

One approach for image analysis and object labeling is to annotate objects in the images with one or more labels. The labeled objects can then be classified and further processed to determine location and velocity. This image and object annotation can be performed manually by people that view each image. However, conventional manual approaches to annotating images are time-consuming, financially untenable, and prone to inconsistencies resulting from viewers' subjectivities. Automated approaches have also been developed. These automated approaches can be significantly more efficient than manual ones and can be scaled accordingly. Unfortunately, current automated approaches to annotating images produce many mislabeled objects.

SUMMARY

A system and method for implementing an image annotation platform are disclosed herein. The image annotation system described herein can facilitate image analysis and object labeling to annotate objects in images with one or more labels. The labeled objects can then be classified and further processed for vehicle control systems, vehicle simulation systems, or other uses. The image annotation system of an example embodiment can assign image annotation tasks to labelers, aggregate the image annotations provided by the assigned labelers, automatically evaluate the performance of each of the labelers, determine performance-based payments for each of the labelers, and perform other functions on demand. The image annotation system of an example embodiment can include six modules: 1) an initial module, 2) an assignment allocation module, 3) an aggregation module, 4) an output module, 5) an evaluation module, and 6) a payment calculation module. In the example embodiment, the initial module is configured to initialize sources of the images to be processed, register the initial set of labelers to which tasks will be assigned, and configure parameters for the other modules of the image annotation system. The assignment allocation module, according to data from the initial module, can automatically assign standard annotation tasks to labelers, as well as randomly assigning special tasks called "gold tasks" or evaluation tasks, which are designed for the sole purpose of evaluating the quality of the labelers' work. In an example embodiment, one image may be assigned to one or more labelers. Upon receiving labeling task assignments, labelers may annotate or label objects in the input images. If a particular labeler is the first labeler for a particular input image, the labeler's annotations are retained and associated with the input image and the particular labeler. If the particular labeler is not the first labeler for the particular input image and there are retained annotations for the image from other labelers, the particular labeler is enabled to add, delete, or modify the retained annotations made by sequentially prior labelers. As such, the example embodiments can use an annotation verification chain, wherein labelers are enabled to add, delete, or modify annotations for images provided by prior labelers. By use of the annotation verification chain for an image, the aggregation module can determine when to stop assigning the image annotation task to labelers and when to begin to aggregate the retained annotations for the image. An image annotation task that has completed the annotation verification chain is denoted a closed task. Once the annotations for the input image produced by one or more labelers have been completed, aggregated annotation data and labeler data is sent (or made available) to the aggregation module and the payment calculation module. The aggregation module can determine whether the annotation task assignment for the particular input image can be closed or needs to be redone by or re-assigned to another labeler. If the annotation needs to be redone or re-assigned, the aggregation module can send (or make available) the annotation and labeler data to the assignment allocation module for assignment to another labeler. If the annotation for the input image does not need to be redone or re-assigned, the aggregation module can send (or make available) the annotation and labeler data to the output module, the payment calculation module, and the evaluation module. The output module can provide the annotated image or the object labels for the input images as a semantic label map or other labeled image dataset, which can be used by vehicle control systems, vehicle simulation systems, or other applications. The payment calculation module can generate performance-based payment amounts for each of the labelers based on configuration parameters set by the initial module and the performance of each labeler as determined by the evaluation module. The evaluation module, after receiving an indication from the assignment allocation module that a particular labeler has finished a task assignment, can evaluate the performance of the particular labeler relative to the assigned task. Based on the evaluation of a particular labeler as determined by the evaluation module, the payment calculation module can adjust (i.e., increase or decrease) the payment amount for the particular labeler based on the labeler's performance in completing the assigned task. The image annotation system of the example embodiments can use the evaluation tasks and a probability model to evaluate the performance of each labeler and to assign a weight to the annotations produced by each labeler based on their performance evaluation. As a result, the example embodiments can reduce the significance of the annotations produced by poorly performing labelers based on their evaluation. Conversely, the example embodiments can increase the significance of the annotations produced by favorably performing labelers based on their evaluation. The aggregate image annotations are thereby improved. Using the processing modules of an example embodiment as disclosed herein, the image annotation system can generate labeled image datasets in a more efficient, accurate, and economical way.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

A system and method for implementing an image annotation platform are disclosed herein. The image annotation system described herein can facilitate image analysis and object labeling to annotate objects in images with one or more labels. The labeled objects can then be classified and further processed for vehicle control systems, vehicle simulation systems, or other uses. The image annotation system of an example embodiment can assign image annotation tasks to labelers, aggregate the image annotations provided by the assigned labelers, automatically evaluate the performance of each of the labelers, determine performance-based payments for each of the labelers, and perform other functions on demand. The image annotation system of an example embodiment can include six modules: 1) an initial module, 2) an assignment allocation module, 3) an aggregation module, 4) an output module, 5) an evaluation module, and 6) a payment calculation module. In the example embodiment, the initial module is configured to initialize sources of the images to be processed, register the initial set of labelers to which tasks will be assigned, and configure parameters for the other modules of the image annotation system. The assignment allocation module, according to data from the initial module, can automatically assign standard annotation tasks to labelers, as well as randomly assigning special tasks called "gold tasks" or evaluation tasks, which are designed for the sole purpose of evaluating the quality of the labelers' work. In an example embodiment, one image may be assigned to one or more labelers. Upon receiving labeling task assignments, labelers may annotate or label objects in the input images. If a particular labeler is the first labeler for a particular input image, the labeler's annotations are retained and associated with the input image and the particular labeler. If the particular labeler is not the first labeler for the particular input image and there are retained annotations for the image from other labelers, the particular labeler is enabled to add, delete, or modify the retained annotations made by sequentially prior labelers. As such, the example embodiments can use an annotation verification chain, wherein labelers are enabled to add, delete, or modify annotations for images provided by prior labelers. By use of the annotation verification chain for an image, the aggregation module can determine when to stop assigning the image annotation task to labelers and when to begin to aggregate the retained annotations for the image. An image annotation task that has completed the annotation verification chain is denoted a closed task. Once the annotations for the input image produced by one or more labelers have been completed, aggregated annotation data and labeler data is sent (or made available) to the aggregation module and the payment calculation module. The aggregation module can determine whether the annotation task assignment for the particular input image can be closed or needs to be redone by or re-assigned to another labeler. If the annotation needs to be redone or re-assigned, the aggregation module can send (or make available) the annotation and labeler data to the assignment allocation module for assignment to another labeler. If the annotation for the input image does not need to be redone or re-assigned, the aggregation module can send (or make available) the annotation and labeler data to the output module, the payment calculation module, and the evaluation module. The output module can provide the annotated image or the object labels for the input images as a semantic label map or other labeled image dataset, which can be used by vehicle control systems, vehicle simulation systems, or other applications. The payment calculation module can generate performance-based payment amounts for each of the labelers based on configuration parameters set by the initial module and the performance of each labeler as determined by the evaluation module. The evaluation module, after receiving an indication from the assignment allocation module that a particular labeler has finished a task assignment, can evaluate the performance of the particular labeler relative to the assigned task. Based on the evaluation of a particular labeler as determined by the evaluation module, the payment calculation module can adjust (i.e., increase or decrease) the payment amount for the particular labeler based on the labeler's performance in completing the assigned task. The image annotation system of the example embodiments can use the evaluation tasks and a probability model to evaluate the performance of each labeler and to assign a weight to the annotations produced by each labeler based on their performance evaluation. As a result, the example embodiments can reduce the significance of the annotations produced by poorly performing labelers based on their evaluation. Conversely, the example embodiments can increase the significance of the annotations produced by favorably performing labelers based on their evaluation. The aggregate image annotations are thereby improved. Using the processing modules of an example embodiment as disclosed herein, the image annotation system can generate labeled image datasets in a more efficient, accurate, and economical way.

Figure 1:
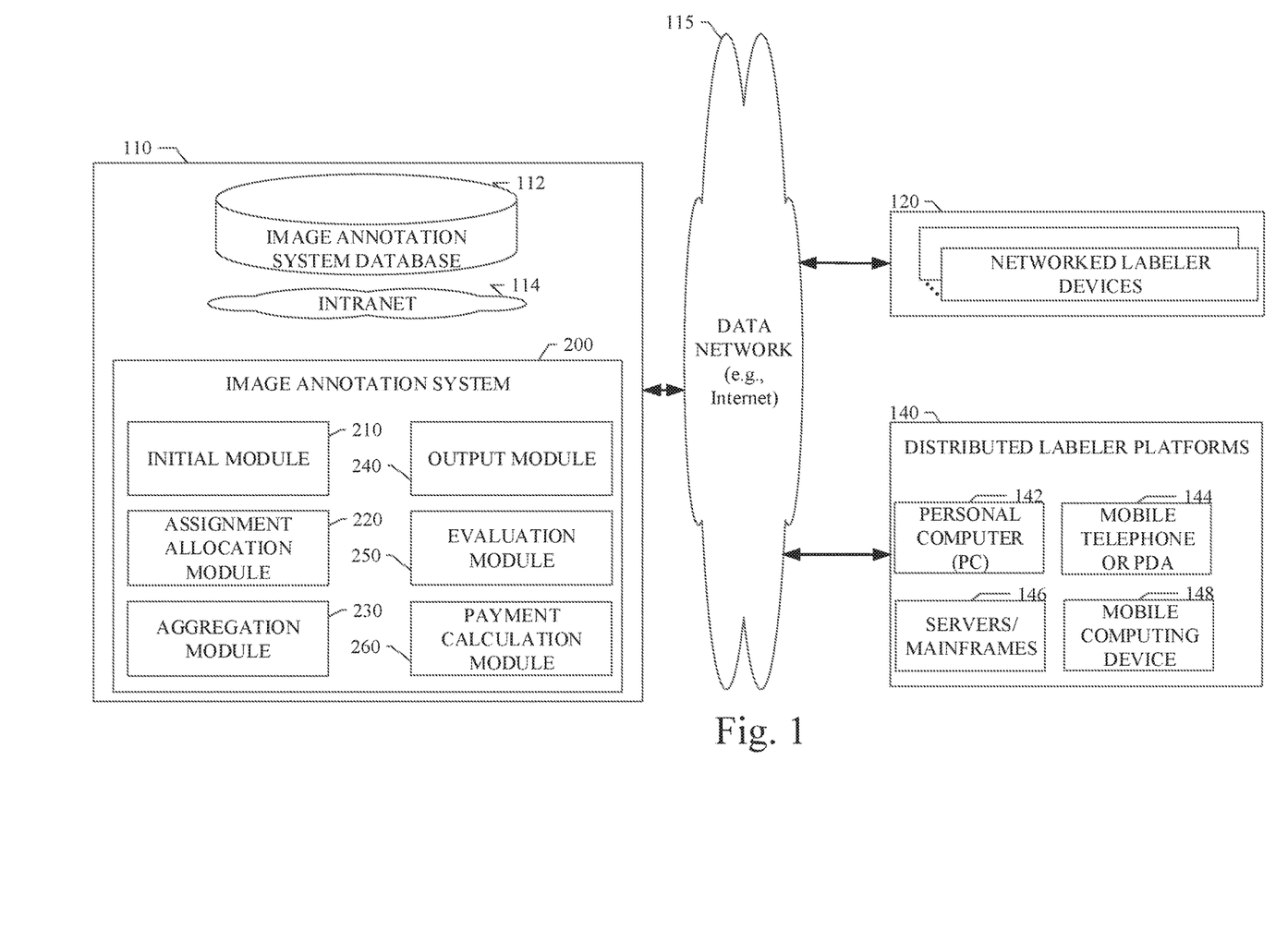
FIG. 1 illustrates an example embodiment of a networked system in which various embodiments may operate.

As described in various example embodiments, a system and method for implementing an image annotation platform are described herein. Referring to FIG. 1, an example embodiment disclosed herein can be implemented as an application or service, typically provided by or operating on a server or host site 110. The host site 110 is provided to simplify and facilitate the hosted use of the image annotation system 200 of an example embodiment. In a particular embodiment, the image annotation system 200 can be hosted by the host site 110 and used with a plurality of networked labeler devices via a data network 115, such as the Internet. Labelers can use the networked labeler devices. The networked labeler devices can include a plurality of networked labeler devices 120 and/or a plurality of distributed labeler platforms 140. The networked labeler devices can also include directly connected (e.g., non-networked) computing devices. The details of the image annotation system 200 of an example embodiment are provided below.

Referring again to FIG. 1, the image annotation system 200 can be in network data communication with a plurality of networked labeler devices 120 and/or a plurality of distributed labeler platforms 140. The networked labeler devices 120 can include computing systems, data processors, or other network resources at which data processing for or by an image labeler can be performed. The plurality of distributed labeler platforms 140 represent the variety of different types of processing platforms at which the data processing for or by an image labeler can be performed. Any of the networked labeler devices 120 can be implemented on any one of the distributed labeler platforms 140.

In various embodiments, the distributed labeler platforms 140 with one or more networked labeler devices executing therein enable the image annotation system 200 to assign image annotation or object labeling tasks to one or more networked labeler devices of networked labeler devices 120 or distributed labeler platforms 140 via the host 110 and network 115. The networked labeler devices of networked labeler devices 120 or distributed labeler platforms 140 may include virtually any computing device that is configured to process data and send and receive information over a network, such as network 115. Such networked labeler devices may include portable devices 144, such as, cellular telephones, smart phones, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. The networked labeler devices may also include other computing devices, such as personal computers 142, multi-processor systems, mainframe computers, servers 146, microprocessor-based or programmable computing systems, network PC's, and the like. The networked labeler devices may also include other processing devices, such as mobile computing devices 148, which are known to those of ordinary skill in the art. As such, the networked labeler devices of distributed labeler platforms 140 may range widely in terms of capabilities and features. Moreover, the networked labeler devices may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and/or send digital information. In other embodiments, mobile devices can be configured with applications (apps) with which the functionality described herein can be implemented.

The networked labeler devices of distributed labeler platforms 140 may also include at least one application that is configured to receive image annotation task assignments from another computing device via a wired or wireless network transmission. The application may include a capability to provide and receive textual data, graphical data, video data, audio data, and the like. Moreover, networked labeler devices of distributed labeler platforms 140 may be further configured to communicate and/or receive a message, such as through a Short Message Service (SMS), direct messaging (e.g., Twitter™), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

One or more of the networked labeler devices 120 and the distributed labeler platforms 140 can be provided by one or more third party providers operating at various locations in a network ecosystem. It will be apparent to those of ordinary skill in the art that networked labeler devices 120 or distributed labeler platforms 140 can be any of a variety of networked third party data processing systems. In a particular embodiment, a labeler registry or list maintained at the host site 110 can be used as a registry or list of all networked labeler devices 120 and distributed labeler platforms 140, which the host site 110 may use to assign image annotation tasks. The host site 110, networked labeler devices 120, and distributed labeler platforms 140 may communicate and transfer data and information in the data network ecosystem shown in FIG. 1 via a wide area data network (e.g., the Internet) 115. Various components of the host site 110 can also communicate internally via a conventional intranet or local area network (LAN) 114.

Networks 115 and 114 are configured to couple one computing device with another computing device. Networks 115 and 114 may be enabled to employ any form of computer readable media for communicating information from one electronic device to another. Network 115 can include the Internet in addition to LAN 114, wide area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth™, satellite, or modem and temporary telephone link.

Networks 115 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 115 and 114 may also include an autonomous system of terminals, gateways, routers, and the like connected by wireless radio links or wireless transceivers. These connectors may be configured to move freely and randomly and organize themselves arbitrarily, such that the topology of networks 115 and 114 may change rapidly and arbitrarily.

Networks 115 and 114 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of networked labeler devices 140, with various degrees of mobility. For example, networks 115 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 115 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, networks 115 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The networked labeler devices 120 and/or the distributed labeler platforms 140 may communicate on network 115 via any of a variety of types of network transportable digital data. The network transportable digital data can be transported in any of a family of file formats and associated mechanisms usable to enable a host site 110 and a distributed labeler platforms 140 to receive image annotation task assignments over the network 115. Any electronic file format and any data interchange format defined by specific sites can be supported by the various embodiments described herein.

Referring again to FIG. 1, the image annotation system 200 of an example embodiment is shown to include image annotation system database 112. The image annotation system database 112 can be implemented with standard data storage devices (e.g., flash memory, DRAM, SIM cards, or the like) or as cloud storage in a networked server. The database 112 can be used to retain a variety of information data sets including, but not limited to, image annotations or object labels, image annotation task assignments, labeler data, labeler evaluation data, payment calculation data, and the like. It will be apparent to those of ordinary skill in the art that the image annotation system database 112 can be locally resident at the host site 110 or remotely located at other server locations or stored in network cloud storage.

Referring again to FIG. 1, host site 110 of an example embodiment is shown to include the image annotation system 200. In an example embodiment, the image annotation system 200 can include an initial module 210, an assignment allocation module 220, an aggregation module 230, an output module 240, an evaluation module 250, and a payment calculation module 260. Each of these modules can be implemented as software components executing within an executable environment of image annotation system 200 operating on host site 110. Each of these modules of an example embodiment is described in more detail below in connection with the figures provided herein.

Referring still to FIG. 1, the image annotation system 200 can include an initial module 210. The initial module 210 can be configured to perform the processing as described herein. In an example embodiment, the initial module 210 can be configured to initialize sources of the images to be processed, register the initial set of labelers to which tasks will be assigned, and configure parameters for the other modules of the image annotation system. In general, the initial module 210 can build a build a project for annotating a set of images or videos from one or more image sources. The project can include a set of annotation tasks to annotate each of the images of the set of images with object labels or other image annotations. Each annotation task can correspond to the annotation of one or more images of the set of images. As described in more detail below, each annotation task can be assigned to one or more labelers, who will view the images corresponding to the annotation task, identify objects in the images, and provide annotations or labels associated with the objects identified in the images. As also described in more detail below, the annotation tasks for assignment to one or more labelers can include gold tasks or evaluation tasks, which are used to evaluate the performance of a labeler. The initial module 210 can also be configured to initialize various parameters for the other modules of the image annotation system as described in more detail below.

Referring still to FIG. 1, the image annotation system 200 can include an assignment allocation module 220. The assignment allocation module 220 can be configured to perform the processing as described herein. In an example embodiment, the assignment allocation module 220 can be configured to assign annotation tasks to one or more labelers at networked labeler platforms 140 or locally resident platforms. The assignment allocation module 220, according to data from the initial module 210, can automatically assign standard annotation tasks to labelers, as well as randomly assigning special tasks called "gold tasks" or evaluation tasks, which are designed for the sole purpose of evaluating the quality of the labelers' work. The "gold tasks" or evaluation tasks are described in more detail below. In an example embodiment, one image may be assigned to one or more labelers. As such, the annotation tasks associated with each image can be assigned to one or more labelers. Upon receiving annotation task assignments, labelers may annotate or label objects in the input images. If a particular labeler is the first labeler for a particular input image, the labeler's annotations are retained and associated with the input image and the particular labeler. If the particular labeler is not the first labeler for the particular input image and there are retained annotations for the image from other labelers, the particular labeler is enabled to add, delete, or modify the retained annotations made by sequentially prior labelers. As such, the example embodiments can use an annotation verification chain, wherein labelers are enabled to add, delete, or modify annotations for images provided by prior labelers. Thus, the annotation verification chain allows a next assigned labeler to perform annotation tasks based on results produced by previous labelers. By use of the annotation verification chain for an image, the aggregation module 230 can determine when to stop assigning the image annotation task to labelers and when to begin to aggregate the retained annotations for the image. An image annotation task that has completed the annotation verification chain with a pre-determined level of confidence is denoted a closed task. Once the annotations for the input image produced by one or more labelers have been completed, aggregated annotation data and labeler data is sent (or made available) to the aggregation module 230 and the payment calculation module 260.

Referring still to FIG. 1, the image annotation system 200 can include an aggregation module 230. The aggregation module 230 can be configured to perform the processing as described herein. In an example embodiment, the aggregation module 230 can be configured to determine whether the annotation task assignment for the particular input image can be closed or needs to be redone by or re-assigned to another labeler. If the annotation needs to be redone or re-assigned, the aggregation module 230 can send (or make available) the annotation and labeler data to the assignment allocation module 220 for assignment to another labeler. If the annotation for the input image does not need to be redone or re-assigned, the aggregation module 230 can send (or make available) the annotation and labeler data to the output module 240, the payment calculation module 260, and the evaluation module 250. As described above, the example embodiment provides an annotation verification chain to validate the accuracy of image annotations across a plurality of labelers. Because the example embodiment uses a verification chain to produce image annotation results validated by a plurality of labelers, the annotations for each object in an image can be tracked and the best or preferred annotation(s) for each object can be determined. (e.g., a bounding box for a car or other object). In an example embodiment, the annotations for a particular object produced by a plurality of labelers can be compared against each other. The similarity of the annotations produced by multiple labelers can be determined based on a similarity of structure, shape, function, classification, and the like. The annotation having the most similar characteristics can be identified as the best or preferred annotation. In particular, the example embodiment can calculate a similarity value for each pair of annotations for one specific object. Then, the embodiment can find one annotation which has the largest similarity relative to all other annotations for the same object. As a result, the aggregation module 230 can collect the annotations for a particular object as provided by multiple labelers, compare the annotations for the object, and determine the best or preferred annotation for the object among the plurality of annotations provided by the multiple labelers. Thus, the aggregation module 230 can aggregate the annotations provided by multiple labelers to produce a preferred object annotation. If the quality or accuracy of the preferred object annotation, based on the similarity analysis, does not achieve a pre-determined confidence or sufficiency level, the aggregation module 230 can send (or make available) the annotation and labeler data to the assignment allocation module 220 for assignment to another labeler. If the quality or accuracy of the preferred object annotation achieves a pre-determined confidence or sufficiency level, the aggregation module 230 can designate the task as closed and send (or make available) the annotation and labeler data to the output module 240, the payment calculation module 260, and the evaluation module 250.

Referring still to FIG. 1, the image annotation system 200 can include an output module 240. The output module 240 can be configured to perform the processing as described herein. In an example embodiment, the output module 240 can be configured to provide the annotated image or the object labels for the input images as a semantic label map or other labeled image dataset, which can be used by vehicle control systems, vehicle simulation systems, or other applications. The output module 240 can also be configured to provide annotation data, object data, labeler data, and labeler evaluation data as outputs for other applications.

Referring still to FIG. 1, the image annotation system 200 can include an evaluation module 250. The evaluation module 250 can be configured to perform the processing as described herein. In an example embodiment, the evaluation module 250 can be configured to evaluate the performance of labelers in performing assigned annotation tasks. In particular, the evaluation module 250, after receiving an indication from the assignment allocation module 220 that a particular labeler has finished a task assignment, can evaluate the performance of the particular labeler relative to the assigned task. Based on the evaluation of a particular labeler as determined by the evaluation module 250, the payment calculation module 260 can adjust (i.e., increase or decrease) the payment amount for the particular labeler based on the labeler's performance in completing the assigned task. The evaluation module 250 can use the randomly assigned "gold tasks" or evaluation tasks and a probability model to evaluate the performance of each labeler and to assign a weight to the annotations produced by each labeler based on their performance evaluation. As a result, the example embodiments can reduce the significance of the annotations produced by poorly performing labelers based on their evaluation. Conversely, the example embodiments can increase the significance of the annotations produced by favorably performing labelers based on their evaluation. The "gold tasks" or evaluation tasks are tasks with a previously-known outcome or output. For example, an evaluation task can present a labeler with an image previously known or expected to have objects of a particular type. The evaluation tasks are not identified as such to the labelers and are randomly presented to the labelers in the same manner as the standard tasks. As such, labelers do not know which of their assigned tasks are standard tasks and which are evaluation tasks. Labelers who provide annotations associated with the evaluation task that correspond to an expected annotation are evaluated positively or favorably. Labelers who provide annotations associated with the evaluation task that do not correspond to an expected annotation are evaluated negatively or unfavorably. The evaluations for each labeler are retained and aggregated over a plurality of annotation task and evaluation task assignments. Over time, the evaluation module 250 can determine an aggregated evaluation score for each labeler. The evaluation score can be used to adjust the payment calculation for each labeler as described below. The evaluation score can also be used to assign a weight to the annotations produced by each labeler based on their performance evaluation as described above.

In a particular embodiment, in addition to the evaluation task analysis as described above, the evaluation module 250 can execute a probability model for each labeler. In the example embodiment, the probability model can be a transition-based probability model. As described above, labelers may add, delete, or modify annotations for each object. As such, there are states for each annotation conditioned on actions by the labelers, such as add, delete, or modify a particular annotation. Based on the analysis as described above, the evaluation module 250 can detect the appropriate or inappropriate actions performed by each of the labelers. For example, a particular labeler may perform inappropriate actions, such as: 1) Add an incorrect or non-preferred annotation, 2) Delete a correct or preferred annotation, or 3) Modify a correct or preferred annotation to an incorrect annotation. Each of these inappropriate actions by a labeler can be detected by the evaluation module 250 and the labeler's evaluation score can be adjusted accordingly. Conversely, the evaluation module 250 can detect the appropriate actions performed by each of the labelers. For example, a particular labeler may perform appropriate actions, such as: 1) Add a correct or preferred annotation, 2) Delete an incorrect or non-preferred annotation, or 3) Modify an incorrect or non-preferred annotation to a correct annotation. Each of these appropriate actions by a labeler can be detected by the evaluation module 250 and the labeler's evaluation score can be adjusted accordingly. Thus, using a variety of techniques, the evaluation module 250 of an example embodiment can produce an evaluation (e.g., an evaluation score) for each labeler. The evaluation score can be used to adjust the payment calculation for each labeler or to assign a weight to the annotations produced by each labeler based on their performance evaluation.

Referring still to FIG. 1, the image annotation system 200 can include a payment calculation module 260. The payment calculation module 260 can be configured to perform the processing as described herein. In an example embodiment, the payment calculation module 260 can be configured to generate performance-based payment amounts for each of the labelers based on configuration parameters set by the initial module 210 and the performance evaluation of each labeler as determined by the evaluation module 250. In an example embodiment, each labeler can be paid based on the quantity of annotation tasks performed, the quality of the annotations provided, and the payment amounts configured by the initial mmodule 210. In the example embodiment, the unit for calculation of payment is based on an annotation element (e.g., the annotation of a single object) not the image as a whole. In other words, the payment calculation can be based on the individual object annotations provided by the labeler. In other embodiments, the payment calculation can be based on the set of object annotations provided by the labeler for an entire image. It would be apparent to one of ordinary skill in the art in view of the disclosure herein that other payment criteria can be used. In an example embodiment, the payment calculation module 260 can implement a labeler payment calculation, such as the following:

$$\text{salary\_base}*(1+\text{salary\_reward}*\text{user\_perf})*(\text{anno\_correct\_adds}+\text{anno\_correct\_checks}*0.1)$$

In the payment calculation set forth above, the terms of the calculation are set forth below:
 a. Salary_base: the base salary allocated to each element,
 b. Salary_reward: a parameter to adjust rewards;
 c. User_perf: a value to denote labeler performance based on the evaluation of the labeler;
 d. Anno_correct_adds: the number of annotation elements that the labeler correctly adds on the image; and
 e. Anno_correct_checks: the number of annotation elements that the labeler correctly reserves on the image because the labeler annotates it based on previous results.

Figure 2:
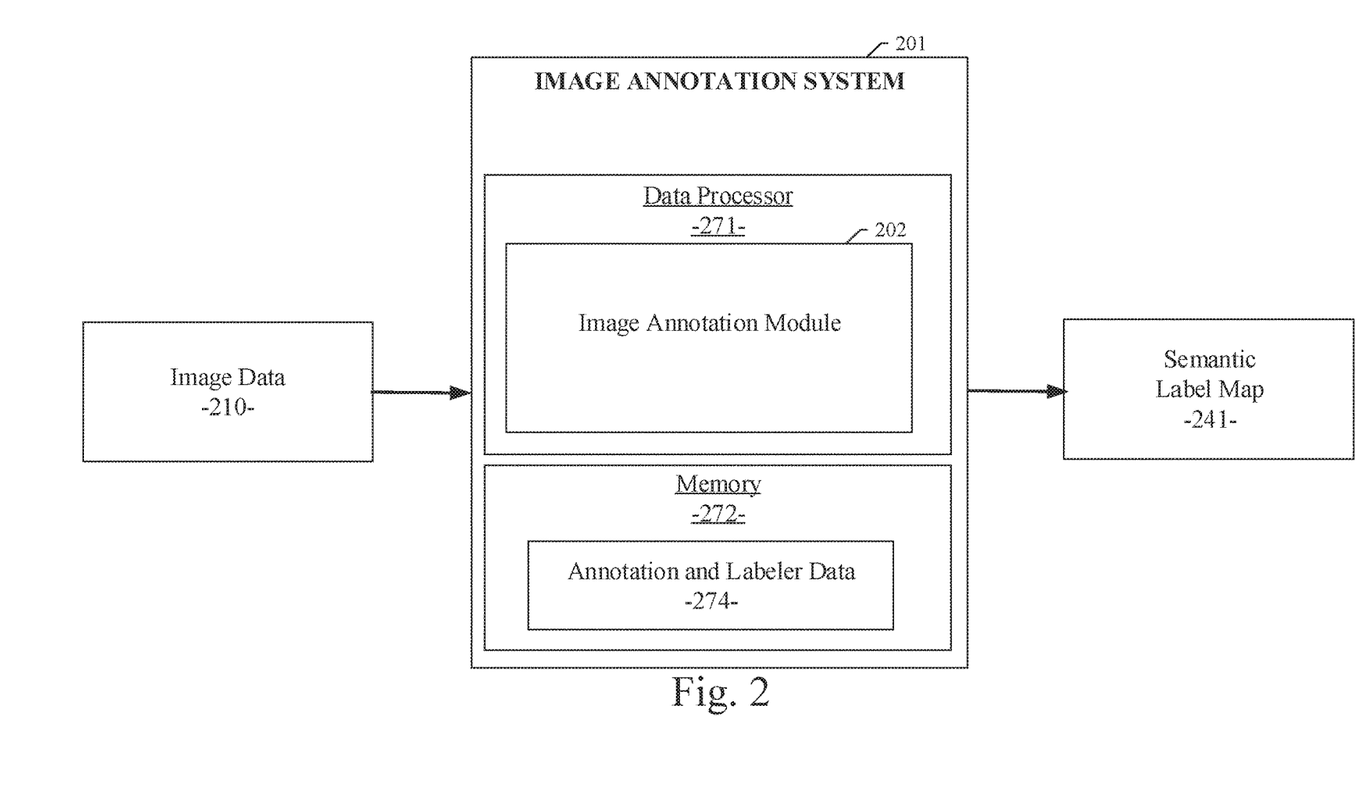
FIG. 2 illustrates the components of the image processing and image annotation module of an example embodiment.

Referring now to FIG. 2, a diagram illustrates an example embodiment of a system for image annotation 201. The image annotation system 201 can include a data processor 271 and a memory 272. The data processor 271 can be used to execute an image annotation module 202, which can perform the functions of the image annotation system 200 as described above. The image annotation system 201 of an example embodiment can receive image data 210 from one or more image sources. The image data 210 can include static images, image streams, video streams, or other types of images. For example, the image sources can be image capturing devices or cameras on an autonomous vehicle. The embodiment shown in FIG. 2 can be a configuration used in or with an autonomous vehicle, which can generate image data from live image or video feeds produced by cameras installed in a vehicle. The memory 272 can be used to retain a variety of information data sets 274 including, but not limited to, image annotations or object labels, image annotation task assignments, labeler data, labeler evaluation data, payment calculation data, and the like. The output module 240 can provide the annotated image or the object labels for the input images as a semantic label map 241 or other labeled image dataset, which can be used by vehicle control systems, vehicle simulation systems, or other applications.

Figure 3:
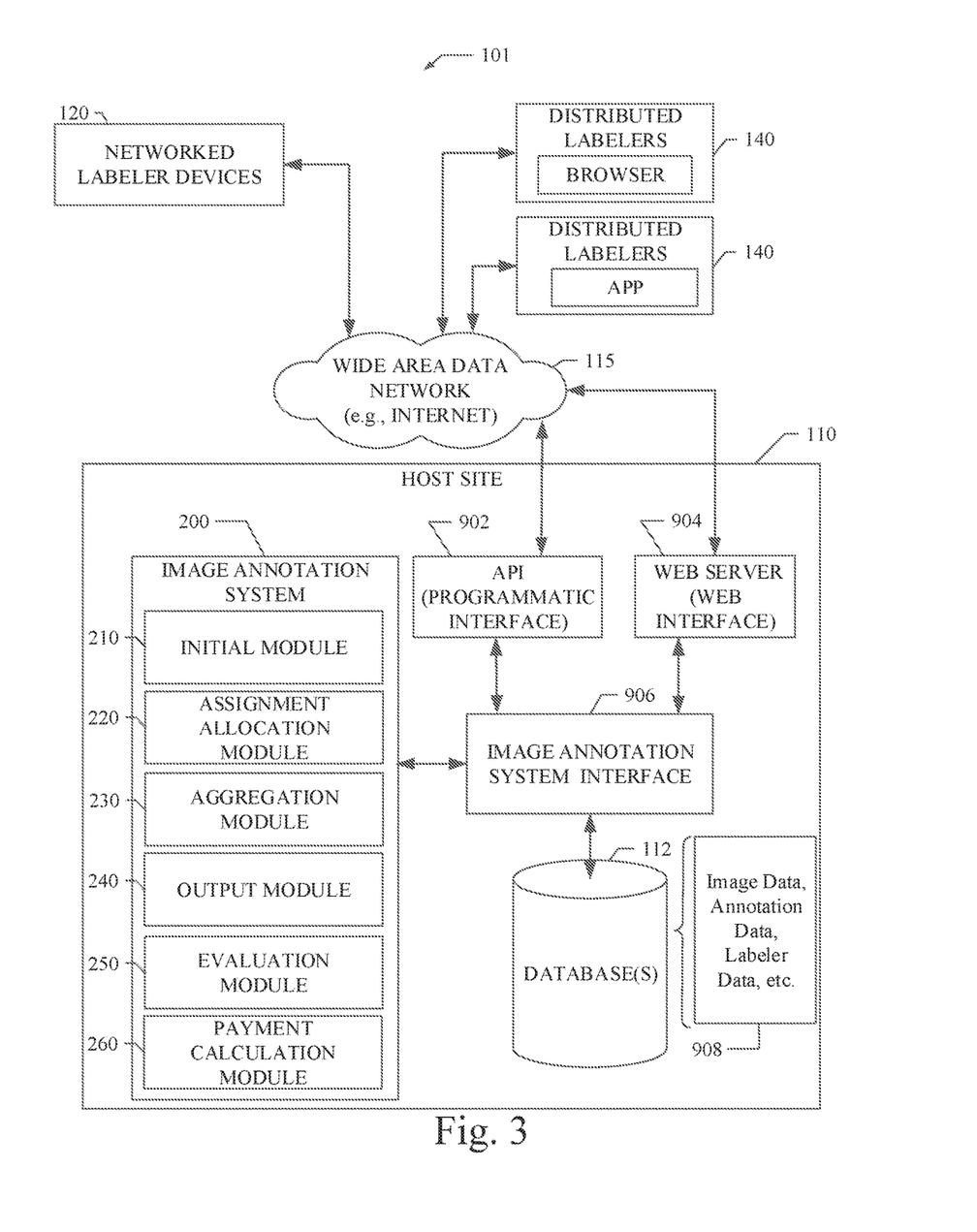
FIG. 3 illustrates another example embodiment of a networked system in which various embodiments may operate.

Referring now to FIG. 3, another example embodiment 101 of a networked system in which various embodiments may operate is illustrated. In the embodiment illustrated, the host site 110 is shown to include the image annotation system 200. The image annotation system 200 is shown to include the functional components 210 through 260, as described above. In a particular embodiment, the host site 110 may also include a web server 904, having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the image annotation system 200 either directly or via an interface 906. The image annotation system 200 may be configured to access the data storage device 112 either directly or via the interface 906. The data storage device 112 can be used to store image date, annotation task data, annotation or object label data, labeler data, labeler evaluation data, labeler payment data, and the like. Labelers can interact with the image annotation system 200 and the host site 110 via the network 115 through standard browsers or applications (apps) operating on the distributed labeler platforms 140.

Figure 4:
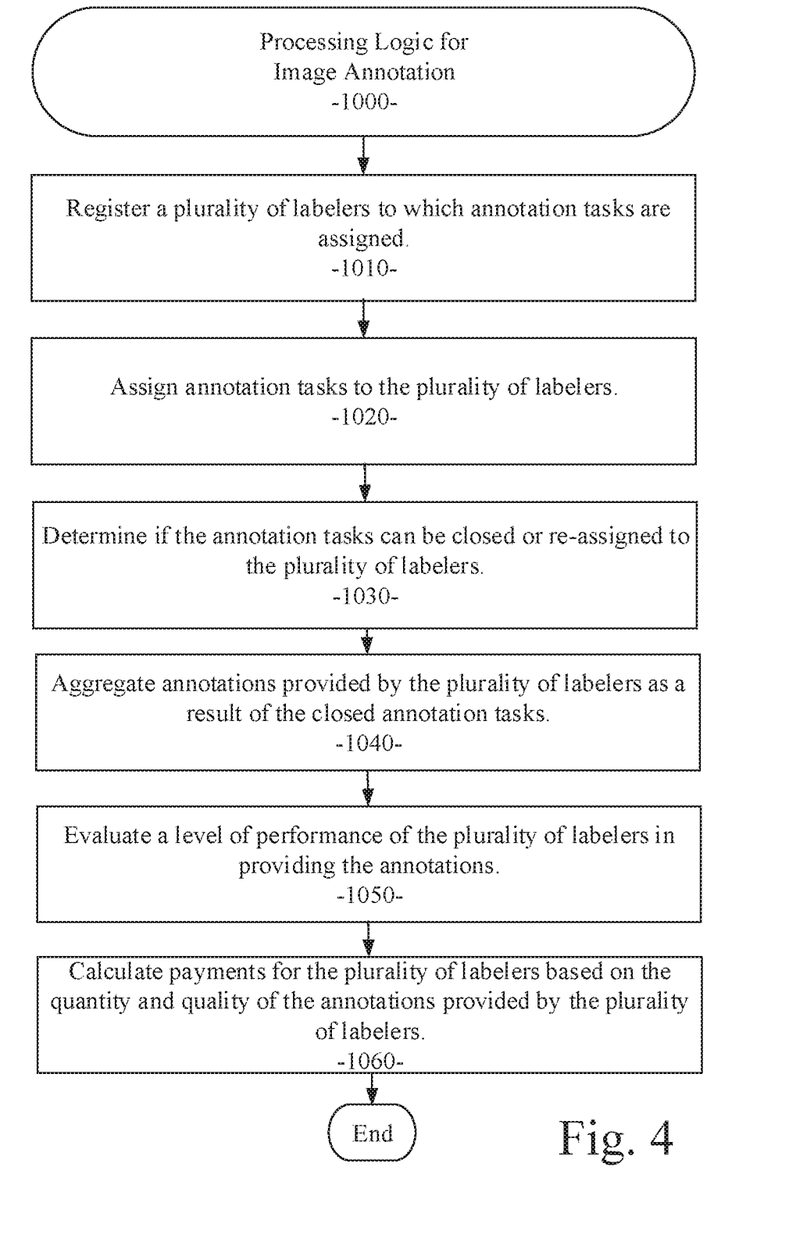
FIG. 4 is a process flow diagram illustrating an example embodiment of a system and method for implementing an image annotation platform.

Referring now to FIG. 4, a flow diagram illustrates an example embodiment of a system and method 1000 for image annotation. The example embodiment can be configured for: registering a plurality of labelers to which annotation tasks are assigned (processing block 1010); assigning annotation tasks to the plurality of labelers (processing block 1020); determining if the annotation tasks can be closed or re-assigned to the plurality of labelers (processing block 1030); aggregating annotations provided by the plurality of labelers as a result of the closed annotation tasks (processing block 1040); evaluating a level of performance of the plurality of labelers in providing the annotations (processing block 1050); and calculating payments for the plurality of labelers based on the quantity and quality of the annotations provided by the plurality of labelers (processing block 1060).

Figure 5:
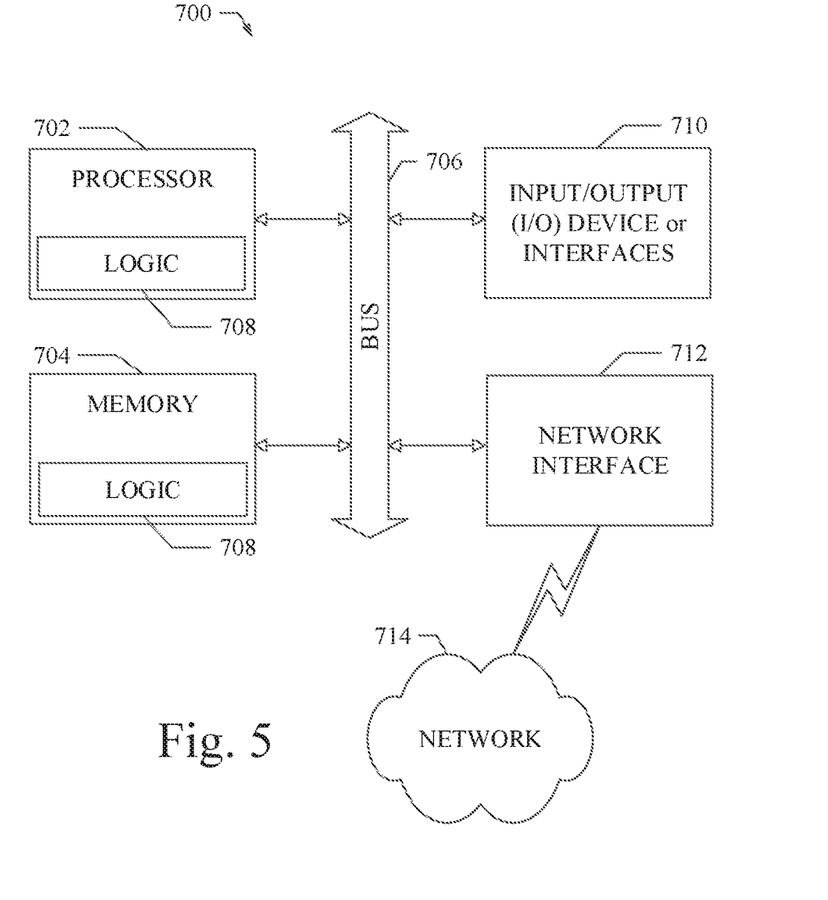
FIG. 5 shows a diagrammatic representation of machine in the example form of a computer system within which a set of instructions when executed may cause the machine to perform any one or more of the methodologies discussed herein.

FIG. 5 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   a data processor; and
   an image annotation module, executable by the data processor, the image annotation module being configured to perform an image annotation operation, the image annotation operation being configured to:
   register a plurality of labelers to which annotation tasks are assigned;
   assign annotation tasks to the plurality of labelers;
   randomly assigning evaluation tasks to the plurality of labelers, the evaluation tasks configured to evaluate the quality of the annotations provided by the plurality of labelers;
   enabling the plurality of labelers in an annotation verification chain to add, delete, or modify annotations provided by sequentially prior labelers;
   determine if the annotation tasks can be closed or re-assigned to the plurality of labelers;
   aggregate annotations provided by the plurality of labelers as a result of the closed annotation tasks;
   evaluate a level of performance of the plurality of labelers in providing the annotations; and
   calculate payments for the plurality of labelers based on the quantity and quality of the annotations provided by the plurality of labelers.

2. The system of claim 1 wherein the plurality of labelers are in networked data communication with the data processor.

3. The system of claim 1 wherein at least one of the assigned annotation tasks is an evaluation task.

4. The system of claim 1 being further configured to enable each of the plurality of labelers to add, delete, or modify annotations provided by prior labelers.

5. The system of claim 1 being further configured to determine if an annotation task needs to be re-assigned to another labeler.

6. The system of claim 1 wherein the annotations correspond to object labels identified in an input image.

7. The system of claim 1 being further configured to receive images from a video feed from an autonomous vehicle.

8. A method comprising:
   registering a plurality of labelers to which annotation tasks are assigned;
   assigning annotation tasks to the plurality of labelers;

randomly assigning evaluation tasks to the plurality of labelers, the evaluation tasks configured to evaluate the quality of the annotations provided by the plurality of labelers;

enabling the plurality of labelers in an annotation verification chain to add, delete, or modify annotations provided by sequentially prior labelers;

determining if the annotation tasks can be closed or re-assigned to the plurality of labelers;

aggregating annotations provided by the plurality of labelers as a result of the closed annotation tasks;

evaluating a level of performance of the plurality of labelers in providing the annotations; and calculating payments for the plurality of labelers based on the quantity and quality of the annotations provided by the plurality of labelers.

9. The method of claim 8 wherein the plurality of labelers are in networked data communication.

10. The method of claim 8 wherein at least one of the assigned annotation tasks is an evaluation task.

11. The method of claim 8 including enabling each of the plurality of labelers to add, delete, or modify annotations provided by prior labelers.

12. The method of claim 8 including determining if an annotation task needs to be re-assigned to another labeler.

13. The method of claim 8 wherein the annotations correspond to object labels identified in an input image.

14. The method of claim 8 including receiving images from a video feed from an autonomous vehicle.

15. A non-transitory machine-useable storage medium embodying instructions which, when executed by a machine, cause the machine to:

register a plurality of labelers to which annotation tasks are assigned;

assign annotation tasks to the plurality of labelers;

randomly assign evaluation tasks to the plurality of labelers, the evaluation tasks configured to evaluate the quality of the annotations provided by the plurality of labelers;

enable the plurality of labelers in an annotation verification chain to add, delete, or modify annotations provided by sequentially prior labelers;

determine if the annotation tasks can be closed or re-assigned to the plurality of labelers;

aggregate annotations provided by the plurality of labelers as a result of the closed annotation tasks;

evaluate a level of performance of the plurality of labelers in providing the annotations; and calculate payments for the plurality of labelers based on the quantity and quality of the annotations provided by the plurality of labelers.

16. The machine-useable storage medium of claim 15 wherein the plurality of labelers are in networked data communication with the data processor.

17. The machine-useable storage medium of claim 15 wherein at least one of the assigned annotation tasks is an evaluation task.

18. The machine-useable storage medium of claim 15 wherein the instructions being further configured to enable each of the plurality of labelers to add, delete, or modify annotations provided by prior labelers.

19. The machine-useable storage medium of claim 15 wherein the instructions being further configured to determine if an annotation task needs to be re-assigned to another labeler.

20. The machine-useable storage medium of claim 15 wherein the instructions being further configured to receive images from a video feed from an autonomous vehicle.

* * * * *